(12) United States Patent
Ylikangas et al.

(10) Patent No.: US 7,727,404 B2
(45) Date of Patent: Jun. 1, 2010

(54) METHOD FOR REMOVAL OF MATERIALS FROM A LIQUID STREAM

(75) Inventors: Atle Mundheim Ylikangas, Omastrand (NO); Christian Klein Larsen, Eiksmarka (NO)

(73) Assignee: Sorbwater Technology AS, Bergen (NO)

( * ) Notice: Subject to any disclaimer, the term of this patent is extended or adjusted under 35 U.S.C. 154(b) by 537 days.

(21) Appl. No.: 11/694,665

(22) Filed: Mar. 30, 2007

(65) Prior Publication Data

US 2007/0235391 A1 Oct. 11, 2007

(30) Foreign Application Priority Data

Apr. 11, 2006 (NO) .................................. 20061642
Feb. 27, 2007 (NO) .................................. 20071122

(51) Int. Cl.
*C02F 1/54* (2006.01)

(52) U.S. Cl. ...................... 210/666; 210/705; 210/712; 210/714; 210/727; 210/728; 210/730; 210/738

(58) Field of Classification Search .................. 210/666
See application file for complete search history.

(56) References Cited

U.S. PATENT DOCUMENTS

| | | | |
|---|---|---|---|
| 1,619,036 A | | 3/1927 | Ravnestad |
| 3,404,142 A | | 10/1968 | Shank et al. |
| 3,677,940 A | | 7/1972 | Fujimoto et al. |
| 4,565,635 A | * | 1/1986 | Le Du et al. ................ 210/727 |
| 4,933,087 A | * | 6/1990 | Markham et al. ........... 210/626 |
| 5,023,012 A | * | 6/1991 | Buchan et al. .............. 252/181 |
| 5,368,742 A | | 11/1994 | Roberts |

(Continued)

FOREIGN PATENT DOCUMENTS

CH 495290 10/1970

(Continued)

OTHER PUBLICATIONS

"The Use of Alginate in Water Purification," Commercial Brochure from Pronova Biopolymer, at least as early as 1989, pp. 1-3, published in Norway.

(Continued)

*Primary Examiner*—Peter A Hruskoci
(74) *Attorney, Agent, or Firm*—FMC Corporation

(57) ABSTRACT

A method for removal of dissolved materials and/or particles from a liquid stream comprising flocculation by vigorously mixing polysaccharides or hydrocolloids into the liquid stream and subsequent gelation of the polysaccharides or hydrocolloids with cations capable of gelling same. Large, strong gelled agglomerates of pollutant and polysaccharide or hydrocolloid are formed with the help of suitable cations. The gelled agglomerates are well suited to separation from a liquid stream by flotation, in a sieve, in a centrifuge, in a cyclone or via other conventional separation processes. Also described is a method for mixing of un-dissolved polysaccharide or hydrocolloid with a polluted aqueous stream by shearing the polysaccharide or hydrocolloid into the aqueous stream to improve logistics and provide economic savings in treatment of large volumes of water. Also described is the use of dilute solutions of polysaccharides for treatment of a variety of effluent streams. An application of the invention is provided for removal of hydrocarbons within the oil industry, but also for other kinds of oil-containing water and also water with organic or particulate pollution.

25 Claims, 2 Drawing Sheets

U.S. PATENT DOCUMENTS

| | | | |
|---|---|---|---|
| 5,433,865 A * | 7/1995 | Laurent | 210/727 |
| 5,478,477 A | 12/1995 | Ramesh et al. | |
| 5,510,037 A | 4/1996 | Tastayre | |
| 5,520,819 A * | 5/1996 | Asahi et al. | 210/727 |
| 5,543,058 A * | 8/1996 | Miller | 210/725 |
| 5,569,385 A | 10/1996 | O'Carroll et al. | |
| 5,693,222 A * | 12/1997 | Galvan et al. | 210/194 |
| 5,935,447 A * | 8/1999 | Febres et al. | 210/703 |
| 6,210,588 B1 * | 4/2001 | Vion | 210/711 |
| 6,211,206 B1 | 4/2001 | Ikeda et al. | |
| 6,641,740 B2 | 11/2003 | Cornelius et al. | |
| 2004/0168980 A1 | 9/2004 | Musale et al. | |

FOREIGN PATENT DOCUMENTS

| | | |
|---|---|---|
| DE | 19626640 | 1/1998 |
| EP | 1063201 A1 | 12/2000 |
| FR | 2537561 | 6/1984 |
| GB | 225635 | 12/1924 |
| GB | 608468 | 9/1948 |
| GB | 1094803 | 12/1967 |
| JP | 59154190 A2 | 9/1984 |
| JP | S62-277111 | 12/1987 |
| JP | 10076274 A2 | 3/1998 |
| JP | 2000070611 | 3/2000 |
| JP | 2001219005 | 8/2001 |
| JP | 2004040287 | 2/2004 |
| KR | 9609380 B1 | 7/1996 |
| NO | 161596 C | 9/1989 |
| RU | 2296721 | 4/2007 |
| WO | 2007029111 A1 | 3/2007 |

OTHER PUBLICATIONS

"Water Treatment," Application Bulletin, FMC BioPolymer, 2004, pp. 1-3, Issue No. 1, published in Norway.

* cited by examiner

METHOD FOR REMOVAL OF MATERIALS FROM A LIQUID STREAM

BACKGROUND OF THE INVENTION

1. Field of the Invention

The present invention relates to a method for removal of organic and inorganic materials from a liquid stream by adding a polysaccharide and/or hydrocolloid, optionally, with a subsequent addition of cations to cause gelation of the polysaccharide and/or hydrocolloid.

2. Description of the Prior Art

Significant quantities of discharge water from the oil industry are typically cleaned by separation of oil in cyclones and in flotation plants. These separation processes lower the content of oil hydrocarbons from about 200-1000 mg/l to about 10-40 mg/l. However, most such processes are subject to variations and often do not yield steady discharges below regulatory requirements (generally, requirements are 15-40 mg/l oil in water). Also, these processes are not well suited to handle water-soluble components, such as $C_1$-$C_5$ alkyl phenols that have a considerable influence on the genetics and reproductive ability of marine life.

Today's methods are not optimal for the treatment of the already large and continually increasing volumes of effluent waters that are generated. These methods are also unable to accommodate variations in the extent of contamination of the water. These methods are also dependent to some extent on chemical and mechanical parameters and cannot handle emulsions very well. The above limitations place limits on the degree of water purification that can be achieved, so that water purification requirements and aims of minimizing harmful discharges are not always met.

The industry has continuously been looking for methods and means that can increase the droplet size of materials to improve the cleaning effect of existing equipment. Such means have hitherto included flocculating agents and dosing of extraction means, for example. Both means have limited applications for such wastewaters. Extraction means are not readily available and lead to a different kind of pollution and the flocculating agents give poor results at high temperatures and in large streams of water with variations in chemical parameters. In particular, use of polymers for precipitation does not function satisfactorily as the polymers operate by encapsulation and give particle conglomerates of low strength and a poor tolerance for mechanical stress which may be exerted on such conglomerates in the various separation methods which may be employed, such as cyclones and harsh flotation units.

With regard to oil/water solutions, it is known that alginate transforms these into stable emulsions by associating the oil drops. An application of this is in connection with the production of oil-containing salad dressings.

It is also known that alginate and carrageenan, extracted from brown algae and red algae, respectively, and pectin extracted from fruit are water-soluble biopolymers, and form hydrocolloid solutions in water. The viscosity forming characteristics of these hydrocolloids are determined by the size of the molecules. Alginate is a copolymer of Mannuronate (M) and Guluronate (G) monomers and contains alternating mannuronate blocks, guluronate blocks (MG-blocks), mannuronate blocks (M-blocks) and guluronate blocks (G-blocks), and the gel-forming characteristics of alginate are dictated by the content of guluronate blocks, and also their length. Alginate's ability to form gels arises from divalent cations (for example $C^{++}$) or other multivalent ions fitting into the G-block structure and thus binding the alginate monomers together to form a continuous network. Application of this mechanism has hitherto been primarily in film-formation, gel-formation in food materials, medicines, textiles, coloured and paper products.

In the field of effluent water cleaning for removal of particulate matter, attempts have been made to use alginate according to the same principle (encapsulation) as with the use of electrolytes, on its own or as a flocculation aid with the use of other flocculating agents, with poor results. It is known from JP 10076274, among others, to use inorganic coagulants, such as $Fe^{3+}$ with the subsequent addition of water-soluble, large molecular size, carboxylic salts for the encapsulation of coagulated material, and then to add multivalent ions to strengthen the coagulated material.

Furthermore, it is known from JP 58029098 that by dispersing oil and water-soluble alginate in a ratio of about 100 parts oil to 0.5-30 parts alginate, and thereafter adding large amounts of multivalent ions, the oil may be transformed into a solid gel that does not float and can easily be handled for combustion.

It is further known from KR 9609380 that a solution of 0.5-1% alginate in water at a pH 1-4, after mixing in water containing heavy metals at a temperature of 20-40° C., can be used to facilitate filtration of the heavy metals from the water after about 20 to 40 minutes.

It is further known from U.S. Pat. No. 5,520,819 that, by adding and thereafter dissolving alginate and a retardant in a slurry of effluent water, dewatering of sludge can be accomplished. Typically, alginate powder is mixed with carbonates, phosphates or citrates as retardants into a slurry, where multivalent ions are a part of the slurry, so that premature gelling with the metal ions and incomplete agglomeration and coagulation with solid matter in the slurry does not occur. The method involves addition of multivalent ions to react the liquid, particles, retardants and neutralised multivalent ions. Examples show that large amounts of powder are added and the treatment time is several hours. Water and particulate matter can be separated in this manner. The examples also appear to indicate that the water should be subsequently treated with inorganic coagulants.

It is also known from JP 19980827 to dose active carbon powder together with polymer flocculants where the powder is mixed in advance, and where the aim is to make the polymer powder soluble in water with no lump formation. This combination is employed to precipitate solid matter in a batch process over time. According to this patent, the advantage compared to water soluble powder is that the polymer has a longer shelf-life and the carbon powder is a means that makes it easier to dissolve the polymer without the formation of clumps in a liquid when the polymer and carbon are mixed together.

SUMMARY OF THE INVENTION

It is an aim of the present invention to provide a new and improved method and process for removal of materials from a liquid stream. In the method, polysaccharide or hydrocolloid is dosed into the liquid stream and certain water soluble ions are added to, or already present in, the stream of water, which ions are sufficient to cause gelation of the polysaccharide or hydrocolloid. Flotation gas may optionally be employed. The method allows mechanical separation of larger conglomerates of gelled polysaccharide or hydrocolloid, thereby enabling purification of continuous liquid streams to relatively high purity in a short time period.

Furthermore, it is an aim of the invention to provide a new and improved process for the above by mixing the polysaccharide or hydrocolloid, in an un-dissolved form, with vigorous mixing by, for example, a high speed, multiphase pump whereby mixing forces ensure an homogeneous mixing of the polysaccharide or hydrocolloid with the liquid stream in a shorter time than is required for gelation of the polysaccharide or hydrocolloid. The polysaccharide or hydrocolloid can be dosed on its own or dispersed or suspended in oil, alcohol, or extraction liquid for water soluble components in the liquid stream, optionally, at the same time as gas/air and liquid are mixed under applied pressure. Cations are then added, if necessary, to ensure gelation of the polysaccharide or hydrocolloid.

In another aspect, the present invention relates to a method for removal of dissolved and/or un-dissolved organic and inorganic pollutants from a continuous stream of liquid by addition of polysaccharides or hydrocolloids in an aqueous solution, optionally in combination with a pulverised sorption agent, followed by a subsequent reaction with multivalent ions already present in the liquid stream, added to the liquid stream, or both. In this aspect, measures are taken to avoid premature gelling of the polysaccharide or hydrocolloid by ensuring thorough mixing at the point of introduction into the liquid stream and/or providing a solution of polysaccharides or hydrocolloids having a concentration of polysaccharides or hydrocolloids which is below the critical overlap concentration, as defined below.

DETAILED DESCRIPTION OF THE PREFERRED EMBODIMENTS

Figure 1:
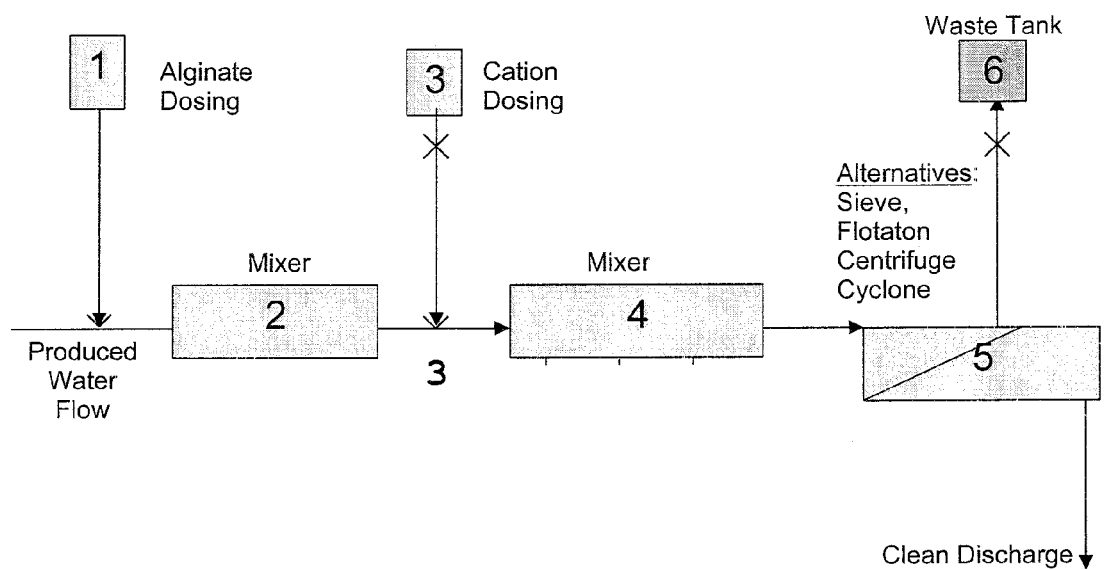
FIG. 1 shows schematically a flow diagram for the full process for cleaning a hydrocarbon-containing liquid stream produced by the oil industry.

The present invention relates to a method for removal of materials from a liquid. The materials may be organic or inorganic materials and may be dispersed, dissolved and/or emulsified in the liquid. Exemplary materials which can be removed from liquid using the process of the present invention include hydrocarbons such as oil, polyaromatic hydrocarbons, naphthalenes and substituted naphthalenes, benzene, toluene, ethylene, xylene and phenols that are dispersed, dissolved or emulsified in water. The present invention is particularly useful for treatment of wastewater with dissolved or emulsified pollutants forming at least one component of the wastewater, though the methods of the present invention can also facilitate removal of particulate matter as well. In one embodiment, the process is employed to treat wastewater produced by the oil and/or gas industry. Also, the process of the invention may be employed to treat injection streams from the oil and/or gas industry prior to injecting the injection streams back into an oil and/or gas production process.

Alternatively, the method can be employed for treatment of other aqueous liquid streams, drinking water, agricultural effluents from, for example, livestock or fish farms, etc. The method can also be applied to other types of polluted waters for removal of, for example, total organic carbon and suspended solids, by dosing polysaccharides or hydrocolloids and, if necessary, addition of multivalent ions, optionally in combination with a stream of flotation gas, whereupon mechanical separation of large conglomerates of gelled material and pollutant is possible. Streams polluted with oils, particles or mixtures thereof may be treated in this manner.

The polysaccharide or hydrocolloid is employed to attach, bind or associate individual pollutant particles, thereby facilitating separation of the particles from water in a mechanical separation step or by flotation. The association of pollutant particles results from the gel-forming characteristics of the polysaccharide or hydrocolloid in the presence of suitable cations. Thus, any polysaccharide or hydrocolloid which can be partially or completed gelled by suitable cations may be employed in the method of the present invention.

The amount of polysaccharide or hydrocolloid employed should be sufficient to obtain the desired level of pollutant removal using the selected separation process or apparatus. Typically, amounts of polysaccharide or hydrocolloid of 0.1-500 ppm in the polluted liquid stream are employed. More preferably, about 0.5-100 ppm of polysaccharide or hydrocolloid is employed, and, most preferably, about 1-50 ppm of polysaccharide or hydrocolloid is employed.

One preferred polysaccharide is alginate. A preferred alginate has a content of G-blocks that is high enough to form sufficiently strong flocs to be separated from the polluted liquid stream by various mechanical methods involving vigorous mechanical manipulation such as cyclone separation. The alginate should have a G-content above 30%, preferably above 40%, and most preferably above 50%. The alginate is preferably selected from sodium alginate, potassium alginate, ammonium alginate, magnesium alginate or another salt of alginate and a monovalent cation. The alginate may be selected to have a medium to high content of G monomers, e.g. 30-50%. Other suitable alginates or alginic acid may be employed. Different contents of G monomers are also possible depending on the particular circumstances of the cleaning process.

Another suitable polysaccharide is carrageenan. The carrageenan can be of the type kappa, iota, lambda, kappa-2 or other variants. The carrageenan should preferably be of the type that is cross-linked by cations.

Another suitable polysaccharide is pectin. Pectin can be of the high methoxylated or low methoxylated pectin types, preferably low methoxylated type that can be cross-linked with multivalent cations. Another suitable polysaccharide is carboxymethyl cellulose (CMC).

The polysaccharide or hydrocolloid is preferably employed in an amount sufficient to attach, bind or associate most or all of the particulate materials and/or droplets of pollutant in the liquid stream. The polysaccharide or hydrocolloid is typically added into the liquid stream with vigorous mixing to facilitate the binding, attachment or association of particulate materials and/or droplets of pollutant.

The binding, attachment or association of the particulate materials or droplets of pollutant are facilitated by the presence of suitable cations. The cations are preferably dissolved in the liquid stream and may already be already present in the liquid stream, added to the liquid stream or any combination thereof. Addition of the cations to the liquid stream, if necessary, may be done before, during or after addition of the polysaccharide or hydrocolloid. This is an important advantage of certain aspects of the present invention since constraints on the order of addition of the materials may be a hindrance to commercial implementation of such purification processes. The present invention, in some cases, provides flexibility in the order of addition of the cations.

Any cation suitable for partial or complete gelation of the polysaccharide or hydrocolloid may be employed in the methods of the present invention. For most polysaccharides or hydrocolloids, multivalent cations will be preferable, though some polysaccharides, such as kappa-carrageenans, can be gelled with monovalent cations. Any suitable alkali metal, alkaline earth metal, transition metal or organic cation may be employed. Cations may also be provided in the form of charged polymers. An exemplary organic cation is chitosan. The cation may be added in solution, suspension, dispersion and/or as a salt. Mixtures of two or more cations may also be employed.

Preferably divalent cations such as calcium ($Ca^{++}$) ion are employed as the cation. Such divalent cations are typically added in the form of a salt in a relatively saturated, saturated or oversaturated solution. For example, a useful cation is calcium provided as a saturated or oversaturated solution of calcium chloride in water.

The cation may be added to the liquid with vigorous mixing to increase the contact between the cations and the polysaccharide or hydrocolloid to thereby enhance binding, attachment or association of the cations and the polysaccharide or hydrocolloid to thereby form relatively large and mechanically strong gel-agglomerates with pollutant bound up therein.

Cations may be dosed to the liquid stream at/into a valve so that gel formation takes place in parallel in a flotation chamber in water saturated with oxygen/gas gel with simultaneous micro-bubble formation during the transition from pressurised to normal pressure to thereby facilitate intimate mixing of the gas/air in and around the gel agglomerates. Such a method is also relevant before mechanical removal in a mechanical filter such as a sieve, but gas/air is not generally used before mechanical removal in a cyclone or a centrifuge.

The gel-agglomerates with pollutant may be removed mechanically from the liquid stream, for example, by flotation, sieving, use of a centrifuge or cyclone, or any combination thereof.

Optionally, a flotation agent such as flotation air or gas can be dosed to the liquid stream via a mixing apparatus such as a multiphase pump or another shear mixing apparatus, together with, or subsequent to dosing of cations and polysaccharide or hydrocolloid in order to bring the pollutant-containing gel to the surface for removal in, for example, a flotation chamber. Air can be added to the suction side of the multiphase pump if flotation is a final treatment. Such air can, on the pressure-side of the pump, be pressurised up to 0.5-80 bar across the valve. Cations may be added to the stream of liquid, if necessary, preferably as the pressure is reduced, for example, via a valve at the inlet of the flotation chamber.

In another embodiment, the entire polluted liquid stream may be fed through a high shear apparatus such as a multiphase pump, alone, or in combination with flotation gas or air. Polysaccharide or hydrocolloid may be added at the inlet of the high shear apparatus. Cations may be added either in the outlet of the shear apparatus, or as pressure in the liquid stream is reduced via, for example, the valve of the flotation chamber.

The present invention distinguishes itself from existing processes/inventions where the principle of application of polyelectrolytes or other flocculating agents for removal of pollutants in a liquid stream is based on either charge neutralisation or encapsulation. In the present invention, larger and stronger agglomerates of gel bound to pollutants are formed more quickly while achieving a substantially complete binding, attachment or association of particles or droplets of materials in the liquid stream. This is accomplished by addition of polysaccharide or hydrocolloid before complete gelation of the polysaccharide or hydrocolloid, optionally in combination with an excess of dissolved cations suitable for gelation of the polysaccharide or hydrocolloid. The present invention permits the reduction of the pollutants to at or below the levels mandated by law, typically, 15-40 mg/l oil in water. Also, the present invention is well-suited to remove substantially all water-soluble components, such as $C_1$-$C_5$ alkyl phenols that have a considerable influence on the genetics and reproductive ability of marine life.

The present invention functions over a pH range of 4 to 12, and is frequently implemented in the pH range of 4 to 9. The method of the present invention is relatively insensitive to temperature in the range 0-100° C.

By use of the term, "flocculation" is meant a process whereby dispersed droplets or particles aggregate to larger particles or aggregates or agglomerates. This includes coagulation of dissolved macromolecules to particles. The methods of the present invention provide flocculation of pollutant-containing materials in a liquid stream.

The embodiments of the present invention can provide a gel strength of the resulting agglomerates that is sufficient to remove the agglomerates in a cyclone, centrifuge or other device which may exert significant forces on the agglomerates during the separation process. Alternatively, the gel strength of the conglomerates containing the pollutant in a liquid stream can be varied according to need, by varying the percentage content of units of that can be gelled in the polysaccharide or hydrocolloid. For example, a medium to high content of guluronate relative to mannuronate monomers when using an alginate is preferred. Large logistic and economic savings can be achieved by transporting concentrated solutions of alginate. By diluting with large volumes of water on site, transport of water can be minimized.

The present invention also provides a way to effectively mix polysaccharide or hydrocolloid in a stream of process water whereby contact between the polysaccharide or hydrocolloid and pollutant is enhanced to facilitate the binding, attachment or association process. In this manner, premature gelation of substantial portions of the polysaccharide or hydrocolloid can be avoided. By premature gelation is meant gelation of polysaccharide or hydrocolloid prior to binding, attachment or association of pollutants. In the case of premature gelation, the polysaccharide or hydrocolloid polymerizes with itself and does not bind, attach or associate pollutants.

In certain embodiments, the polysaccharide or hydrocolloid is added to the liquid stream with vigorous mixing. Such mixing can be effective by a homogenizer, such as an Ultra-Turrax® homogenizer, a high shear apparatus, a high-speed multiphase pump or other suitable, conventional mixing apparatus whereby vigorous mixing forces ensure homogeneous blending of polysaccharide or hydrocolloid the liquid stream in the pump. The mixing should be carried out under conditions sufficient to homogeneously mix the polysaccharide or hydrocolloid with the pollutant-containing liquid stream prior to the occurrence of substantial premature gelation of the polysaccharide or hydrocolloid. The mixing conditions required to achieve this may be adjusted depending on the concentrations, forms and amounts of the various ingredients, the amount of cation present in the liquid stream, when the cation is added, and the speed at which the liquid stream is moving. When a suitable solvent for the polysaccharide is present during mixing, mixing conditions are preferably sufficient to completely dissolve the polysaccharide or hydrocolloid in a liquid phase before it leaves the mixing apparatus. The dissolved polysaccharide will then be mixed homogeneously with the pollutants in the liquid stream. Optionally, gas/air and liquid are mixed with the polysaccharide or hydrocolloid and liquid stream under applied pressure in the high shear apparatus.

Extraction agents, such as those used to extract phenols, can be dosed together with polysaccharide or hydrocolloid with vigorous mixing, such as in a multiphase pump, which, by application of shear also results in homogenous mixing of the extraction agent/pollutant combination with the polysaccharide or hydrocolloid. For example, in the case of using alginate with a phenol extraction agent, the phenol is bound to the G monomers of the alginate, which in turn forms large gel agglomerates that can be separated out by flotation or mechanical separation. Substantially all water-soluble phenol can be removed in this manner. Known technologies employing polymers or polyelectrolytes do not typically remove alkyl phenols with average alkyl chain lengths below $C_5$ as these alkyl phenol fractions are water-soluble.

The dosing order of the present invention may also provide additional advantages. For example, dosing of polysaccharide or hydrocolloid followed by addition of water soluble cations, preferably water and calcium chloride, form very strong, large gel agglomerates including the pollutants which can be substantially completely removed with a variety of different, conventional mechanical separation equipment or processes. The mechanical separation can be done with, for example a sieving cloth, a cyclone, a centrifuge or by a flotation process.

In one embodiment, the present invention is employed to treat a continuous liquid stream and/or is used in a continuous treatment process. Polysaccharide or hydrocolloid may be dosed to the continuous stream at one or more dosing points and thereafter, polluted liquid and polysaccharide or hydrocolloid may be passed through a static or mechanical mixer as a continuous stream. A cation, preferably in the form of calcium chloride in water, may be mixed in with the liquid with sufficient suspension over sufficient time to form the gel agglomerates.

FIG. 1 shows schematically a flow diagram for the full process for cleaning hydrocarbon-containing produced water from the oil industry:

(1) shows dosing point for alginate (2) shows a static or mechanical mixer for alginate (3) shows dosing point for water soluble multivalent cations (4) shows static mixer for water soluble multivalent cations (5) indicates mechanical separation by a sieve, cyclone, centrifuge or flotation chamber (6) shows a collecting tank for the separated pollutant.

The Un-Dissolved Form of Polysaccharide or Hydrocolloid

In one aspect, the invention relates to the addition of polysaccharides or hydrocolloids to a wastewater stream in a form other than dissolved in a solution. For example, the un-dissolved forms may include a powder, a suspension or dispersion. The suspended or dispersed forms may be suspended or dispersed in, for example, alcohol, oil, or an extraction fluid. The powder form may be used as a pure powder, may be used to prepare a suspended or dispersed form of the polysaccharide or hydrocolloid, or may be diluted with an inert material, such as a sorption agent or other suitable diluent. In one embodiment, the powder form is pre-mixed with an extraction agent for one or more of the pollutants in the liquid stream, such as, for example, a $C_0$-$C_5$ alkyl phenol extraction fluid or a suitable sorption agent.

Concentrated forms of the powder are particularly suitable for treatment of liquid streams with relatively low contents of cations capable of gelling the polysaccharide or hydrocolloid. For treatment of liquid streams with higher contents of cations capable of gelling the polysaccharide or hydrocolloid, it is preferably to disperse the powder in one of the various media mentioned above, or to dilute the powder with an inert diluent in order to facilitate a faster homogeneous mixing of the powder into the liquid stream and minimize premature gelation.

The powder form of the anionic polysaccharide or hydrocolloid may be suspended or dispersed in one or more of the following media: an aliphatic hydrocarbon, a vegetable oil, an extraction fluid, an alcohol, a preservative, and an antifreeze agent.

Figure 2:
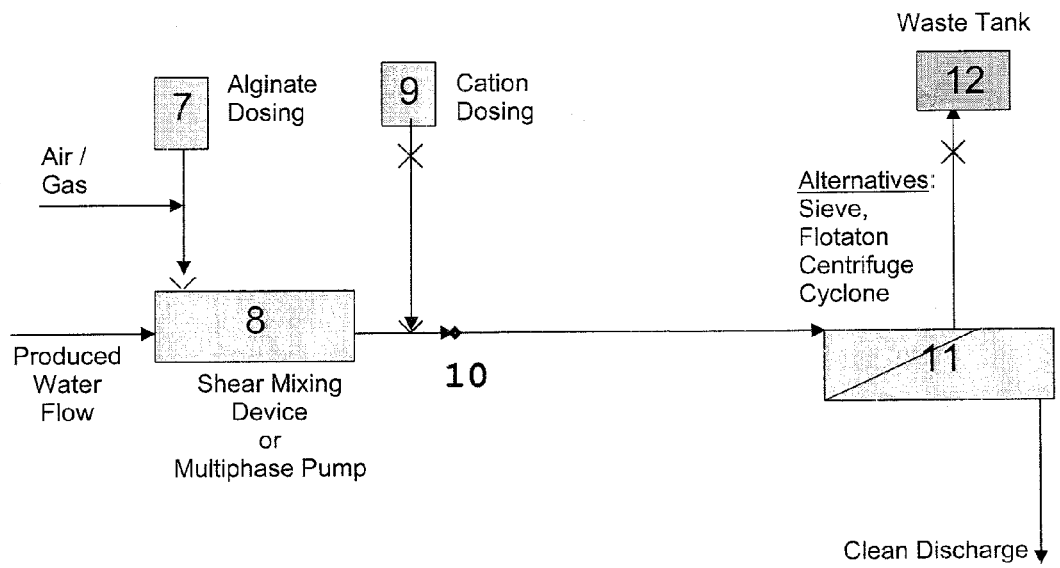
FIG. 2 shows a schematic flow diagram for a process for cleaning of hydrocarbon-containing water produced by the oil industry with addition of un-dissolved alginate under shear in a multiphase pump that is also supplied with air/gas and is pumping against a throttled valve on the pressure side where the pump is situated in the produced stream of water.

FIG. 2 shows a schematic flow diagram for a process for cleaning of hydrocarbon-containing water from the oil industry with addition of un-dissolved alginate under shear in a multiphase pump that is also supplied with air/gas and is pumping against a throttled valve on the pressure side where the pump is situated in the produced stream of water:

(7) shows the dosing point for un-dissolved alginate with possible air/gas.

(8) shows shear pump or multiphase pump for the alginate.

(9) shows the dosing point for water soluble multivalent cations.

(10) shows a throttle valve for mixing of multivalent cations.

(11) indicates mechanical separation with a sieve, cyclone, centrifuge or by flotation.

(12) shows a collecting tank for the separated pollutant.

Figure 3:
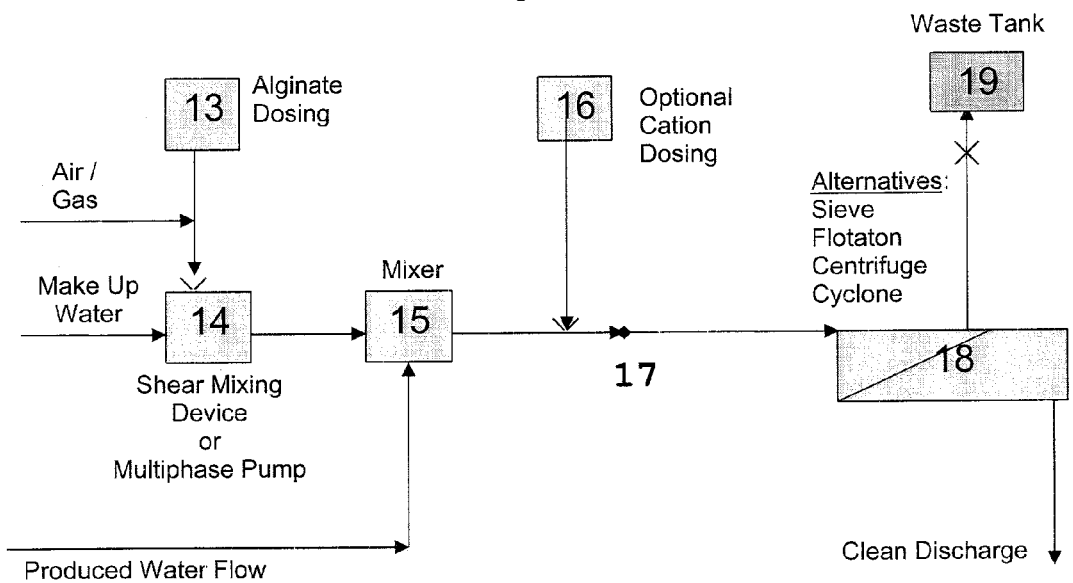
FIG. 3 shows a schematic flow diagram for a process for cleaning of hydrocarbon-containing water from the oil industry with addition of un-dissolved alginate under shear in a multiphase pump which is also supplied with air/gas and where the pump is supplied pure water and pumps the mixture into the produced water stream.

FIG. 3 shows a schematic flow diagram for a process for cleaning of hydrocarbon-containing water from the oil industry with addition of un-dissolved alginate under shear in a multiphase pump which is also supplied air/gas and where the pump is supplied pure water and pumps the mixture into the produced water stream:

(13) shows dosing point for un-dissolved alginate with possible air/gas.

(14) shows a shear pump or multiphase pump for alginate.

(15) shows mixer for alginate/water/air/gas

(16) shows dosing point for water soluble multivalent cations.

(17) shows throttle valve for mixing of multivalent cations.

(18) indicates mechanical separation by a sieve, cyclone, centrifuge or by flotation.

(19) shows a collecting tank for the separated pollutant.

The invention also relates to applications the above-described methods, and to the use of various mixing apparatus, such as a multiphase pump for mixing of an un-dissolved form of polysaccharide or hydrocolloid with a liquid stream.

EXAMPLES OF USE OF UN-DISSOLVED FORMS OF POLYSACCHARIDE OR HYDROCOLLOID

Example 1

A stream of water of 50 000 m$^3$/day with a hydrocarbon level of 200 ppm was cleaned to zero discharge. Sodium alginate was dosed into the water stream at 2 ppm. This results in a consumption of 100 kg of sodium alginate per day. Correspondingly, 50 kg of calcium chloride are used per day.

Calcium chloride was mixed into 100 litres of water without difficulty. As a practical matter, alginate concentrations, when used in a dissolved form in solution, will rarely be above 1% in water. This represents a consumption of 100 m$^3$ of ready-mixed alginate solution per day, which would pose logistical and economic problems. In the case of the use of un-dissolved alginate, as in the present invention, the added material can be reduced to make it possible to use of a 4 m$^3$/h multiphase pump connected to the water supply with a dosing station for 4 kg of dry material per hour.

The extent of cleaning of oil polyaromatic hydrocarbons, total extractable organic carbon, naphthalene phenatrene dibenzothiophen, benzene, toluene, ethylene, xylene and phenols from a dispersed or emulsified liquid by application of the process of the present invention, is nearly 100% with the use of existing technologies for removal of gel-bound pollutants. Where known flocculating agents and polyelectrolytes typically give 40-10 mg/l oil discharge levels with use of subsequent flotation, cyclone or centrifugation, the present invention can achieve discharge levels below 1 mg/l oil.

The method according to the invention shall now be described in more detail with reference to the examples given below and the figures.

Example 2

20 litres of water produced by the oil industry was treated according to the description given below. The initial oil content was 100 ppm, the initial phenol content was 2.1 ppm and the initial benzene, toluene, ethylene and xylene (BTEX) content was 1440 ppb. 2 mg/l sodium alginate was added in powder form during a period of 5 seconds of intense mixing. One could visually see an oil/water phase which remained as a separate phase even when left standing. Thereafter, 1 mg/l calcium chloride was added to the water again during a period of 5 seconds of intense stirring. Large gel agglomerates were formed immediately. After 20 seconds, the water phase was completely clear and oil lay on top of the gel agglomerates. Tests of the water phase showed less than 1 ppm oil remaining. The mixture was stirred rapidly for 15 seconds. After 30 seconds, the water phase was again completely clear. Tests now also showed less than 1 ppm oil in the water phase. The BTEX contents in the water phase before and after stirring were 16 ppb and 28 ppb, respectively. The phenol content in the water phase was 1.3 ppm in both cases.

Example 3

10 litres of a wastewater stream was treated according to the method of Example 2 and with the same initial concentrations, but this time with addition of un-dissolved alginate in a marine oil base in combination with the extraction agent 2-(2-butoxy ethoxy) ethanol under shear. A corresponding procedure was carried out, with visually the same results. For oil and BTEX the results corresponded with the first test, but this test reduced the phenol content in the liquid stream to less that 0.1 ppm in both tested cases.

The Dissolved Form of Polysaccharide or Hydrocolloid

In another aspect, the present invention relates to a process for the removal of dissolved and/or un-dissolved organic and inorganic pollutants from a continuous stream of liquid by blending polysaccharides or hydrocolloids dissolved in water, optionally in combination with a pulverised sorption agent into a continuous stream of liquid. Subsequently, the polysaccharide or hydrocolloid is reacted with suitable cations to cause gelation of the polysaccharide or hydrocolloid and attachment, binding or association of the pollutant-containing materials. The water used to dissolve the polysaccharide or hydrocolloid into the solution may be selected from, for example, fresh water, water containing salts and re-circulated process water.

The continuous liquid stream to be treated can come from a continuous process, a semi-continuous process or a batch process. One of the advantages of the present invention is that a very high degree of purification can be provided in a relatively short time period which makes the present process particularly suitable for the purification of high volume, continuous liquid streams.

The optional sorption agent may be added to the liquid stream prior to addition of the hydrocolloid, simultaneously with the hydrocolloid or subsequent to the addition of the hydrocolloid. Suitable sorption agents include, for example, activated carbon powder, silica, olivine, natural or synthetic zeolites, diatomaceous earth, clay, etc. The pulverised sorption agent particles preferably include nano-particles or sub-micron particles or particles of a size of a few microns, and may be added to a suitably dilute aqueous solution of polysaccharide or hydrocolloid. Conventional amounts of sorption agent used for treatment of liquid streams having same type and concentration of pollutants may be employed in the present process.

The optional sorption agent may also be added as a component of the polysaccharide or hydrocolloid solution. In this case, the sorption agent may be suspended or dispersed in this solution. If this method is to be employed, however, it is preferably to maintain the polysaccharide or hydrocolloid concentration below the critical overlap concentration to avoid potentially blocking the action of the sorption agent. In the examples below, it is demonstrated that at certain concentrations, the polysaccharide or hydrocolloid does not block the activity of the sorption agent and thus permits addition of the sorption agent in this manner, thereby saving a step in the treatment process.

The sorption agent may be selected to be a high density material to facilitate sedimentation if sedimentation is a desired separation method. Alternatively, separate weighting agents may be employed in a conventional manner. Exemplary agents that facilitate sedimentation include barium oxide or iron oxide.

A premix of the polysaccharide or hydrocolloid solution may include one or more of a sorption agent, a preservative for reducing biological activity and an antifreeze agent. Conventional preservatives for reducing biological activity and conventional antifreeze agents known to persons skilled in the art may be employed in conventional amounts.

Upon addition of the polysaccharide or hydrocolloid solution, the liquid stream may contain no cations for gelation of the polysaccharide or hydrocolloid, or it may contain cations. In the case that the liquid stream does not contain sufficient cations to accomplish the desired amount of gelation of the polysaccharide or hydrocolloid, additional cations may be added to the liquid stream. Even if the liquid stream contains some cations, it may be desirable to add additional cations to the liquid stream depending upon such factors as the desired concentration of cations, and the type of cations present or desired in the liquid stream.

A polysaccharide and/or hydrocolloid are dissolved in water and dosed into a continuous stream of liquid with organic and/or inorganic pollutants, in a sufficient amount, and with sufficient mixing in the liquid stream for the polysaccharide and/or hydrocolloid molecules to be distributed substantially homogeneously, and to come into intimate contact with the organic and inorganic pollutants in the liquid stream. The solution of polysaccharide or hydrocolloid preferably has a sufficiently low viscosity to be pumpable and is sufficiently diluted with water that it is able to mix homogeneously with the liquid stream and come into contact with substantially all of the pollutants without substantial premature gelling. Dilution is preferably to a concentration in the solution destined for addition to the polluted liquid stream which is below the critical overlap concentration. The critical overlap concentration is that concentration where there is no formation of a continuous network of polysaccharide molecules in the solution. The critical overlap concentration, $c^*$, can be defined as:

$$C^* = 2.5/(\text{the intrinsic viscosity of the polysaccharide or hydrocolloid in dl/g}).$$

The intrinsic viscosity of the polysaccharide or hydrocolloid is defined as the viscosity at infinite dilution.

In one embodiment, the polysaccharide or hydrocolloid is employed in the form of a highly concentrated solution, which pre-mixed with a liquid stream with vigorous mixing, such as under shear, whereby it is sheared into the liquid stream to a suitable dilution for homogeneous mixing into the continuous polluted liquid stream. By a dilute solution is meant that the polysaccharide or hydrocolloid is present in the solution destined for addition to the polluted liquid stream at a concentration below the critical overlap concentration.

Mixing of the polysaccharide or hydrocolloid solution into the continuous mixing stream is generally accomplished in less than 30 seconds, more preferably, less than 15 seconds, and, even more preferably in about 1-10 seconds.

The polysaccharide and/or hydrocolloid, forms strong gel agglomerates in a short time of generally less than one minute, more preferably, less than 30 seconds and typically in about 1-30 seconds, or 10-20 seconds. The resultant gel agglomerates with pollutant may be removed mechanically, by flotation, or in sieves, in centrifuges or in cyclones or by sedimentation.

The present method has the advantage that low viscosity or diluted polysaccharide or hydrocolloid is mixed with a continuous liquid stream with the aim of flocculating the individual particles whereupon dilution and low viscosity ensure that the hydrocolloid homogeneously rapidly blends into the polluted liquid stream and binds the pollutant without prematurely cross-linking. Dilution and low viscosity obviate the need to use undesirable retardants. This can be carried out by dilution in a batch prepared polymer mixture or by continuous mixing wherein fresh water is added to the hydrocolloid in a mixing appliance whereupon this mixture is continuously dosed directly into a polluted, continuous liquid stream. Cations can optionally be added in advance or after the addition of polysaccharide or hydrocolloid in the polluted liquid stream, and also some or all of the cations can be present naturally in the polluted liquid stream without premature gelling taking place Another advantage of the present invention is that submicron or nanoscale sorption particles can be mixed into the fresh water diluted solution of polysaccharides or hydrocolloids before dosing into the continuous liquid stream without the sorption characteristics being altered, as the dilution ensures that the sorption surfaces are not blocked. Such blocking takes place when mixing a sorption agent into a highly viscous or concentrated solution. This means that a sorption agent of nanoparticle size with a very large active surface can be used as all particles agglomerate in large flocs in contact with cations.

Another advantage is that fine sorption powder, e.g. submicron or nano-sized powder, can be added to the liquid stream before dosing of the solution of polysaccharide or hydrocolloid. Vigorous mixing can be employed to ensure sufficient homogenisation of the polysaccharide or hydrocolloid solution in the polluted liquid stream so that substantially all of the submicron sorption agent comes into contact with the polysaccharide or hydrocolloid. The sorption agent can thereby take up dissolved compounds in the polluted liquid, whereupon dissolved compounds in the submicron sorption agent are flocculated by the subsequent cross-linking of the polysaccharide or hydrocolloid with cations.

A submicron sorption agent can be added together with a diluted polysaccharide to a homogeneous mixture with a polluted liquid stream without the sorption characteristics being blocked using, for example, the following steps:

a) sorption of dissolved compounds in a polluted liquid stream,
b) attachment of polysaccharide to inorganic and organic particulate pollutants in the liquid stream,
c) cross-linking between polysaccharide and added or already present multivalent cations, and
d) flocculation to easily separable agglomerates of submicron particulate sorption agent, and also particulate pollutants present in the process water, drinking water or effluent water.

The present invention provides larger and stronger agglomerates of gel bound to pollutant in a relatively short time by the mixing of polysaccharide or hydrocolloid before complete binding of with cations. A fast flocculation is achieved by a combination of one or more of dilution of hydrocolloid in water, vigorous mixing and/or application of low viscosity polysaccharides or hydrocolloids which are pumpable without premature gel formation.

The method may be applied, for example, by homogeneously mixing a dilute solution of polysaccharide or hydrocolloid into the liquid stream, where the polysaccharide is present in a concentration below the critical overlap concentration, and achieves contact between pollutant and polysaccharide or hydrocolloid before premature cross-linking to thereby coalesce small oil drops together to larger oil drops which can easily be separated out. The critical overlap concentration is typically about 0.1 weight percent of alginate, based on the combined weight of the water and alginate. Although the polysaccharide or hydrocolloid can be added in solutions of up to about 2 weight percent, based on the combined weight of the water and polysaccharide or hydrocolloid, solutions in the range of 0.001-1.0 weight percent are preferred, more preferably, solutions of about 0.001-0.1 weight percent, and most preferably, solutions of about 0.01-0.1 weight percent, based on the combined weight of the polysaccharide or hydrocolloid and the water, are used.

The entire process may take place in a matter of seconds so that both un-dissolved and dissolved pollutants can easily be separated from the liquid stream. Furthermore, the process may be employed for the cleaning of drinking water where the described process steps remove pesticides, humus and other dissolved/un-dissolved organic and inorganic pollutants including multivalent cationic metal compounds.

The treated liquid is amenable to further processing using a method selected from reverse osmosis, nano-filtration, ultra-filtration, medium filtration, mechanical filtration, flotation, sedimentation, using a cyclone, using a centrifuge, by treatment with ultraviolet light, by chemical treatment, and by evaporation.

The method according to the second aspect of the invention employing a polysaccharide or hydrocolloid solution shall be explained in more detail with reference to the following examples.

Test 1

One litre of humus containing surface drinking water (raw water) with colour number 80 Pt/Hz was treated in each of the tests. The humus content in the water was 35-40% low molecular fulvic acid with molecular weights of 160-800. These are not particles and can consequently not be precipitated with alginate. However, they can be adsorbed onto active charcoal powder (PAC). The remaining 60-65% of the humus was humic acid with molecular weights mainly from 180000 to 250000. These are particles, with sizes ranging from 0.003 to 0.8 μm. They are too large to be adsorbed on PAC, but can be precipitated with alginate.

A stock solution of deionised water and sodium alginate was prepared with 0.2 g sodium alginate being sheared and dissolved into 1 litre of deionised water. 0.04 g active charcoal powder with a particle size of 3-5 micron was mixed into 100 ml of the stock solution. PAC in dry powder form with a particle size of 3-5 micron ($PAC_{3-5}$) and also PAC in powder form with a particle size of 40-50 micron ($PAC_{40-50}$) were also prepared. In all of the sub-experiments described below, the water after treatment was filtered through a 25 micron filter before analyses were carried out.

Test 1A.

10 ppm $PAC_{40-50}$ was added as a dry powder to one litre of raw water with stirring using magnetic stirring bars at full speed to create a vortex for one minute. Then, the mixture was filtered and the colour number was determined.

Test 1B 2.5 ppm sodium alginate from the stock solution was added to polluted water, and homogeneously mixed into, one litre of raw water, followed by addition of 10 ppm $Ca^{++}$ added as a slightly oversaturated concentrated calcium hydroxide solution in water to form a milky liquid via a controlled addition using a pipette. The mixture was stirred with magnetic stirring bars for 30 seconds before filtration and sampling.

Test 1C 5 ppm $PAC_{3-5}$ was added as a powder and homogeneously mixed into one litre raw water under stirring for 30 seconds. Then, 2.5 ppm sodium alginate from the stock solution was homogeneously mixed into the polluted water followed by addition of 10 pm $Ca^{++}$ as a slightly oversaturated concentrated calcium hydroxide solution in water to form a milky liquid. The mixture was stirred for 30 seconds before filtration and sampling.

Test 1D 100 ml of the mentioned stock solution of sodium alginate and $PAC_{3-5}$ were pre-mixed and the mixture was then homogeneously mixed into one litre raw water containing 2.5 ppm sodium alginate and 5 ppm $PAC_{3-5}$ and stirred for 30 seconds. $Ca^{++}$ dissolved in water was added as calcium hydroxide and the mixture was stirred for 30 seconds prior to filtration and sampling. Colour number was determined using Norwegian standard NS4787.

Results (colour number Pt/Hz) from test 1:

| Raw water | Test 1A | Test 1B | Test 1C | Test 1D |
|---|---|---|---|---|
| 80 | 39 | 31 | 3 | 3 |

The tests confirm that fulvic acid is absorbed by active charcoal and alginate flocculates the larger un-dissolved humus molecules that are too large for adsorption but large enough to be considered as particulate fragments.

Test 2

Attempts were made to repeat tests 1A-1D but with the difference that 10 ppm $Ca^{++}$, as a slightly oversaturated concentrated calcium hydroxide solution in water, was added before the dosing in of PAC and sodium alginate. Homogeneous mixing in of the alginate/PAC was ensured by stirring with magnetic stirring bars for 20 seconds prior to filtration. The results were almost identical to those obtained in tests 1A-1D, Test 3

The stock solution was replaced by a solution of 1% alginate mixed into deionised water. The tests were carried out as in test 1B and produced the same results as in 1B. The tests carried out as in test 1C also showed identical results. However, duplication of test 1D with this alginate concentration showed that PAC was inactivated by the 1% alginate dissolved in the stock solution, as the results from this test corresponded to those obtained in test 1C. Thus, the PAC was inactivated without low molecular weight fulvic acids being removed.

Test 4

One litre of process water taken from downstream of the first separation step in an oil production from a reservoir was treated. The process water contained 1500 ppm oil hydrocarbons and 10353 microgram BTEX. By adding and mixing 2.5 ppm stock solution as described in test 3, no cleaning effect was observed as premature gelling took place. The reason for this is that such process water contains 600-800 ppm $Ca^{++}$, about 200 ppm $Ba^{++}$, some $Ra^{++}$ and also $Mg^{++}$.

By using a dilute solution as in test 1B with no addition of extra multivalent ions, the premature gelling was eliminated as a consequence of the dilution. Flocculated oil separated out and was lying on the surface. Analysis of samples from the clear water phase after one minute showed a hydrocarbon content less than 0.5 ppm and a BTEX content of 298.5 microgram. Hydrocarbon content was determined using Norwegian standard NS-EN-ISO9377-2. TOC was determined using Norwegian standard NS-EN-1484. BTEX and phenol content was determined using gas chromatography and mass spectroscopy.

Test 5

0.5 ppm alkyl phenol ($C_0$) was added to one litre of water. Tests conducted by blending in 2.5 ppm sodium alginate from the stock solution and subsequent mixing of 10 ppm $CaCl_2$ resulted in flocculation, and sampling from the clear water phase was carried out after one minute. The test gave no reduction in the phenol content of the water.

The test was repeated as described in test 1C, and thereafter as in test 1D. The results from these tests showed essentially complete removal of phenol. The mechanism was adsorption in PAC with subsequent flocculation caused by the addition of $CaCl_2$.

Test 6

Process water was used, as in test 4. In test 3 hydrocarbon agglomerates flocculated quickly and rose to the surface because of the specific gravity of 0.86 for the hydrocarbons and a specific gravity below 1 for alginate. In this test, barium oxide powder with a specific gravity of 4.6 was mixed into the alginate dissolved in water. The result was that flocculated pollutant settled immediately out of the pollutant stream demonstrating that oil can be removed from the liquid stream as an alternative to flotation.

Test 7

The process water used in tests 4 and 6 was used. The procedure from test 4 was repeated, but in this test barium oxide was replaced by nano powder of $Fe_2O_3$ with a specific gravity of 4.27 and uniform particle size of 19-23 nm. Flocculated material sank to the bottom as in test 4, and samples were taken from the clear water phase. The samples showed complete removal of $Fe_2O_3$ and the test documented the ability of alginate to remove even nano particles Test 8

This test demonstrates that the present invention can provide a very fast flocculation by cross-linking anionic polysaccharide. The anionic polysaccharide was contacted with suspended solids, in the presence of multivalent cations in the liquid. This flocculation was carried out without the use of sequestering agents to prevent premature gelling, and without a subsequent addition of multivalent ions to cause flocculation.

A stock solution of 1% Na-Alginate (RF 6850) was made up of de-ionized water. A 10% $CaCl_2$ solution was made up of tap water with a pH of about 6-6.5. Dilutions were made of the alginate stock solution at 0.1%, 0.01% and 0.001% with de-ionized water. An activated carbon powder solution in tap water (pH 6-6.5) was pre-made for the various tests containing 1000 ppm of fine powdered carbon with a significant quantity of sub micron particles having a maximum particle size of 5 microns, hereinafter referred to as "the PAC solution."

Four glasses each containing 150 ml of PAC solution were prepared and the $CaCl_2$ solution was added to obtain final concentrations of 10 ppm, 100 ppm, 500 ppm and 1000 ppm. Then, the various alginate solutions were tested for premature gelling and effective flocculation. The alginate solutions were mixed into the polluted water containing a very high pollution concentration and PAC solution to a concentration of 10 ppm with sufficiently vigorous mixing to distribute the alginate substantially homogeneously in the polluted water volume over a period of 1-2 seconds.

Half of the volume of the treated solution was immediately poured rapidly into a 25 micron filter, and the other half of the treated solution was retained for observation. The filtered water and retained treated solutions were inspected under a microscope. Premature gelling was indicated by fiber-shaped particles of gelled alginate containing substantially no pollutants. Slight precipitation indicates smaller flocs (e.g. 200 microns to 0.5 mm in size) were formed than for rapid precipitation (flocs of millimeter size range). Slight precipitation could be useful for flotation or media filtration separation methods. The results were as follows:

| $CaCl_2$ Concentration | 1.0% Alginate solution | 0.1% Alginate solution | 0.01% Alginate solution | 0.001% Alginate solution |
|---|---|---|---|---|
| | | Example 8.a) | | |
| 10 ppm | 8.a.1.) Filtered water was dark with fine carbon particles. No visible precipitation or gelling. | 8.a.2) Filtered water was dark with fine carbon particles. No visible precipitation or gelling. | 8.a.3.) Filtered water was dark with fine carbon particles. No visible precipitation or gelling. | 8.a.4.) Filtered water was dark with fine carbon particles. No visible precipitation or gelling. |
| | | Example 8.b) | | |
| 100 ppm | 8.b.1.) Filtered water was darker than water with fine carbon particles of the previous test. No precipitation and slight premature gelling was observed. | 8.b.2.) Filtered water was clear and had fine carbon particles. Slight precipitation. No visible premature gelling was observed. | 8.b.3.) Filtered water was completely clear. Rapid precipitation was obtained, and no visible premature gelling was observed. | 8.b.4.) Filtered water was clear and precipitated, but with some visible particles of 10-20 micron size. No premature gelling and slow precipitation was observed. |
| | | Example 8.c) | | |
| 500 ppm | 8.c.1.) Filtered water darker than previous 100 ppm $CaCl_2$ test 8.b.1). No precipitation. Premature gelling was | 8.c.2.) Filtered water less clear than previous 100 ppm $CaCl_2$ test 8.b.2). Slight precipitation and slightly visible | 8.c.3.) Completely clear filtered water. Rapid precipitation and no visible premature gelling were observed. | 8.c.4.) Filtered water was clear and precipitated, but with some particles of 10-20 micron size visible. No premature |

-continued

| CaCl$_2$ Concentration | 1.0% Alginate solution | 0.1% Alginate solution | 0.01% Alginate solution | 0.001% Alginate solution |
|---|---|---|---|---|
| | observed. | premature gelling were observed. | | gelling, and slow precipitation were observed. |

Example 8.d)

| CaCl$_2$ Concentration | 1.0% Alginate solution | 0.1% Alginate solution | 0.01% Alginate solution | 0.001% Alginate solution |
|---|---|---|---|---|
| 1000 ppm | 8.d.1.) Filtered water dark with fine carbon particles. Total premature gelling and no precipitation were observed. | 8.d.2.) Filtered water dark with fine carbon particles. No precipitation. Medium visible premature gelling was observed. | 8.d.3.) Completely clear filtered water. More rapid precipitation than similar test with 500 ppm CaCl$_2$ and no visible premature gelling were observed. | 8.d.4.) Filtered water was clear and precipitated, but with some particles of 10-20 micron size visible. No premature gelling, and slow precipitation were observed. |

Test 8.e)

The four dilutions in example 8.a) was repeated, but this time with 1 litre of effluent filtered in a small sand media filter removing all particles larger than 5-6 microns. Dilutions as in tests 8.a) and 8.b) resulted in poor removal of sub micron particles in the media filter. Dilutions as in tests 8.c) and 8.d) gave full removal of sub micron particles in a 4-6 micron media filter, indicating that for media filtration high dilutions can be favourable as suitable smaller flocs may be created.

Test 9

The tests in the example above were repeated with white clay sub micron particles diluted and suspended in tap water in the same concentrations as in Examples 8.a)-8.d), using the same mixing ratios and mixing times as in Examples 8.a)-8.d). The results were substantially the same as the results described in Examples 8.a)-8.d).

Test 10

In order to verify the rapid reaction of the present invention high shear mixing was employed for short time periods relative to the cross-linking reaction time to premature gelling. A preferred alginate/calcium ion weight ratio of 1/9 was tested where the alginate solution used for dosing had a concentration just below the theoretical overlap concentration of 0.1%.

First, a PAC solution was prepared as described in Example 8. Then, the alginate/calcium ion solution was instantly mixed into the PAC solution using a shear mixing device under the following conditions:

a) 90 ppm Ca$^{+2}$ was dosed and in 1-2 seconds homogeneously mixed into the PAC/tap water solution as CaCl$_2$. Then the alginate in a concentration of 10 ppm was mixed with shear into the solution. The alginate was potassium alginate dissolved in de-ionized water at a concentration just below the theoretical critical overlap concentration of 0.1% by weight in de-ionized water. The alginate was mixed for 1-2 seconds which was adequate for homogenous mixing into the PAC/water/CaCl$_2$ solution.

The solution was thereafter immediately dropped into a filter bag with cut of 25 microns. The sub micron particles were flocculated immediately and easily filtered. Particle free water was observed leaving the filter from the first drop 2-3 seconds after mixing was stopped and the fluid was dropped into the filter. This was verified by studying these first drops under a microscope. The method shows sufficient flocculation and building of floc strength in 5 seconds or less to carry out many conventional separation processes to remove the flocs from the liquid stream.

b) 90 ppm Ca$^{+2}$ was dosed and mixed into the PAC/tap water solution as CaCl$_2$ simultaneously with the alginate at a concentration of 10 ppm. Both additives were added under shear mixing conditions into the solution over a period of 2 seconds. The alginate was potassium alginate dissolved in de-ionized water at a concentration just below the theoretical critical overlap concentration of 0.1% by weight in de-ionized water. Immediately after the two seconds of shear mixing for homogenous dispersion, the solution was dropped into a filter bag with cut of 25 microns. Sub micron particles were flocculated and easily filtered off. Particle free water was observed leaving the filter from the first drop 2-3 seconds after mixing was stopped and the fluid was dropped into the filter. This was verified by studying these first drops under a microscope. The method shows sufficient flocculation and building of floc strength in five seconds or less during simultaneously mixing of divalent ions and said polysaccharide to perform many conventional separation processes. In addition, premature gelling was prevented by the combination of the dilution of polysaccharide and the high speed shear mixing.

c) 10 ppm alginate was dosed under shear mixing conditions into the PAC/tap water solution over 1-2 seconds whereupon 90 ppm Ca$^{+2}$ as CaCl$_2$ were mixed under shear into the solution over another 1-2 seconds. The alginate was potassium alginate dissolved in de-ionized water at a concentration just below the theoretical critical overlap concentration of 0.1% by weight in de-ionized water. The alginate and cross linking agent were mixed together over a period of four seconds, and the solution was then immediately dropped into a filter bag with cut of 25 microns. Sub micron particles were flocculated and easily filtered off. Particle free water was observed leaving the filter from the first drop 2-3 seconds after mixing was stopped and the fluid was dropped into the filter. This was verified by studying these first drops under a microscope. The method shows sufficient flocculation and building of floc strength in five seconds or less for conventional separation processes as a result of mixing of divalent ions after dosing said polysaccharide when such divalent ions are not present in the water. The method also shows that when divalent ions are not initially present in the water, alginate in very concentrated solutions can be brought into contact with particles almost instantly, whereafter almost instant cross-linking can be obtained by adding multivalent ions. The mixing speed ratio of said components in the polluted water is the time limiting factor rather than the chemical reactions. This unexpected finding represents a significant improvement for online separation of pollution from large continuous water streams.

d) The processes in tests 10a), 10b) and 10c) were repeated with stirring instead of vigorous mixing or shear mixing. It was observed that premature gelling took place in tests repeating 10a) and 10b). Multiplying the dosed alginate by a factor of two, however, formed flocs after 30 seconds. Floc formation to the point of visible precipitation took more than a minute and the water phase was not clear when vigorously mixed. Relative to previous tests, the flocs were not suitable in size for removal via a sieve, and the smaller flocs were relatively weak, breaking into smaller particles when further stirred.

In a test similar to test 10c), when stirring, flocs were obtained with the same initial concentration as in test 10c) in a total of 1 minute from initial dosing of alginate. 30 seconds were used to mix the alginate, and another 15 seconds to mix the $CaCl_2$, and another 15 seconds were required for floc formation.

Test 11

In order to illustrate the superior floc strength that enables use of the flocculation methods as explained in previous examples, flocculated fluid processed as in tests 10a), 10b) and 10c) were, after 30 seconds rest, processed in a high shear standard kitchen mixer for one minute. Surprisingly, the flocs could still be filtered in a 25 micron filter, and the water phase did not become dark or turbid. After 30 seconds, the flocs re-agglomerated and settled and left a clear water phase.

Many high capacity processing apparatus used for separation of solids from liquid streams, including, cyclones, stripping devices, centrifuges, flotation processes, and high-g vibrating screen devices cannot be combined with effective flocculants because the floc strength produced by such flocculants is too weak for the flocs to survive the harsh treatment encountered in the separation process. These processes easily remove any particle larger than five microns. The failure of the high shear kitchen mixer to break the flocs made by the methods of the present invention demonstrates that the present method is suitable for process water treatment combined with a variety of different equipment that presents problems when used with some conventional flocculants and/or flocculating methods.

Test 12

Raw sewage from a municipal treatment plant was collected in the influent stream after a 2 mm coarse screen filtering step. Total organic carbon (TOC) was measured at 63 mg/l. The water was filtered in a nano-membrane for complete removal of suspended solids. This was done in order to characterise how much of the organic content that was solved organic pollution, known to be inaccessible for flocculation using alginate alone. Removal by membrane filtration gave a TOC of 23 mg/l. A series of 8 parallel tests were carried out by dosing 15 ppm sodium alginate in a 0.5% by weight solution in de-ionized water, followed by vigorous mixing for 30 seconds, and then vigorous mixing of 40 ppm of $CaCl_2$ as a slightly oversaturated concentrated aqueous solution gave immediate flocculation and sedimentation. After only five minutes the clear water phase was sampled for analysis of suspended solids without any kind of filtration or other treatment. The samples were analysed for TOC for comparison with the membrane filtered reference sample.

6 of 8 samples showed identical results as membrane filtration, 23 mg/l TOC. 2 of 8 samples showed 24 mg/l TOC. This test shows that the alginate treatment is very fast and that very small concentrations were sufficient to remove all suspended solids, Test 13

Removal of blood plates in slaughterhouse waste water is extremely difficult, and is currently performed with inorganic flocculants which has the consequence that the solid waste cannot be processed further for animal food, nutrients, high value proteins and enzymes etc. Especially blood plates from wastewater from salmon slaughter houses are difficult to handle as these blood plates are suspended in seawater in the process of fish slaughtering. These blood plates are considered to be of high value for further processing.

In this example, 5 litres of fresh blood wastewater from a salmon slaughterhouse was treated with 5 ppm of potassium alginate diluted to a 0.05% aqueous solution with de-ionized water prior to dosing into the polluted water. At a pH above 8.5, preferably 9.5 the alginate solution was added in a few seconds under vigorous mixing to produce immediate separation of blood plates and fat from the seawater without further addition of multivalent ions. The dark red flocculated material floated quickly to the surface, and below a crystal clear water phase appeared. The floated high value material is made available for further refinement by the present process for potential use in foods, medicines, etc.

Test 14

A full scale test set up as described in FIG. 2 was assembled for this test. 400 grams of sub micron white clay, 400 grams of powdered PAC with particle sizes from sub micron to 3 microns were homogenously suspended in 8000 litres of tap water in a tank to provide the aqueous media to be treated in this example. A solution of 1% by weight of potassium alginate of the type Protanal® KF 200 from FMC Biopolymer AS, based on the combined weight of the alginate and water, was prepared in de-ionized water for dosing to the aqueous media via an Iwaki Membrane Dosing Pump (7). A saturated solution of $CaCl_2$ in tap water was prepared for dosing via a Iwaki Membrane Dosing Pump (9).

The shear mixing device (8) was a 4-stage multiphase pump of the type EB4u from Edur Pumpenfabrik in Germany. The suction side of the shear mixing device (8) was connected to an air supply hose, and also on the suction side a separate dosing inlet was provided for the alginate solution. The air was supplied by the vacuum naturally created at the suction side of the pump, and it was regulated by a simple air valve. The divalent cation dosing point was located at the 1" pipe in which the flow was pumped from the multiphase pump, 2 cm in front of the separation device (11).

The separation device (11) was a MI-Epcon Compact Flotation Unit tank (CFU). This unit was in this case a closed cylindrical tank with a diameter of 30 cm, a height of 70 cm and a volume of 50 litres (the effective water volume in the tank is 35 litres). The CFU has a reject outlet for separated pollution, and in this case the rejected material was fed to a separate tank (12).

The MI Epcon proprietary CFU separating process involves extremely rough material handling during flotation air/gas stripping from the separator ejector system at the tank inlet, as well as a cyclone effect. The CFU is rarely applied for separation processes other than oil-separation because these separation mechanisms are far too rough to be applicable in conjunction with flocs formed by conventional flocculants for particle separation because the applied forces break up the flocs thereby impeding separation. At the end of the process, a tank of 10 m³ collected the treated water.

The test was performed with a flow of 2 m³/hour. Dosing of alginate was adjusted to provide a 10 ppm concentration of alginate in the polluted water. CaCl$_2$ was dosed to provide 100 ppm of Ca$^{+2}$ ions in the polluted water. The 4-stage multiphase pump was adjusted to 2900 rpm/min with 0.4 bar vacuum at the suction side allowing 6 litres of air/min to be drawn into the pump, where alginate was sheared into the polluted water/air mixture in about one second.

A 0.5 metre 1" pipeline from the pump (8) to the CFU (11) allowed for a 6 second contact time between the alginate solution and the polluted water before the CaCl$_2$ was dosed. The contact time after CaCl$_2$ dosing, but before the treated fluid entered the separation process in the CFU tank was less than 1 second. Total process time in the tank was 1 minute after which the treated water was collected in the collecting tank.

The result of the test was that the rejected water, approximately 1% of the total flow, was a combination of dark, strong flocs and water. The effluent water was clear non-turbid water and it was not possible to see a difference between the effluent water and the original tap water prior to the addition of particulates to form the polluted water. It also appeared that all particles were removed from the effluent stream in the separation process. The test proved that the rapid flocculation reactions described in the invention can be applied in full-scale processing and that the strength of the resultant flocs is sufficient to withstand even very harsh separation conditions.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

The invention claimed is:

1. Method for removal of pollutants including dispersed, dissolved, and/or emulsified pollutants from a continuous aqueous stream comprising the steps of:
   a) adding to said aqueous stream a solution of an anionic polysaccharide or hydrocolloid compound under sufficient mixing to ensure substantially homogeneous mixing of said solution with said aqueous stream prior to premature gelation of said anionic polysaccharide or hydrocolloid to bind, attach, and/or associate with said pollutants, wherein the polysaccharide or hydrocolloid is selected from pectin, carrageenan, carboxymethyl cellulose and alginates, which polysaccharides or hydrocolloids are able to cross-link with cations, and
   b) flocculating the pollutants to form gelled agglomerates including said pollutants by reaction of said anionic polysaccharide or hydrocolloid with cations capable of gelling said polysaccharide or hydrocolloid to cross-link said polysaccharide or hydrocolloid with said cations, and
   c) separating the gelled agglomerates from the aqueous stream.

2. Method according to claim 1 wherein a sorption agent is added to the aqueous stream prior to, or together with the anionic polysaccharide or hydrocolloid.

3. Method according to claim 2, wherein the sorption agent is added to the aqueous stream together with the polysaccharide or hydrocolloid solution.

4. Method according to claim 2, wherein the sorption agent is a liquid, and a slurry mixture is prepared by mixing a solid polysaccharide or hydrocolloid, water and sorption agent in a shear mixing device operating with a sufficient shear strength to dissolve the solid polysaccharide or hydrocolloid into a substantially homogeneous solution with the sorption agent dispersed or suspended in said solution.

5. Method according to claim 2, wherein the sorption agent is a solid and is added directly into the aqueous stream.

6. Method according to claim 2, wherein the mixing of the polysaccharide or hydrocolloid solution and the aqueous stream is conducted using a high shear mixing apparatus.

7. Method according to claim 6, wherein the mixing of the polysaccharide or hydrocolloid solution and the aqueous stream is conducted using a multiphase mixing pump.

8. Method according to claim 2, wherein the cations capable of gelling the polysaccharide or hydrocolloid are added directly to the aqueous stream prior to, simultaneously with, or after the addition of the polysaccharide or hydrocolloid solution.

9. Method according to claim 2, wherein the polysaccharide or hydrocolloid is present in the solution at a concentration of from 0.001% by weight to 0.10% by weight, based on the combined weight of the water and the polysaccharide or hydrocolloid.

10. Method according to claim 1, wherein the polysaccharide or hydrocolloid is present in the solution added to the aqueous stream at a concentration below a critical overlap concentration, to enhance the mixing of the polysaccharide or hydrocolloid and the aqueous stream.

11. Method according to claim 1, wherein the polysaccharide or hydrocolloid concentration in said solution is regulated by water addition.

12. Method according to claim 1, wherein the solution of polysaccharide or hydrocolloid is added to an aqueous stream containing dissolved cations capable of gelling said polysaccharide or hydrocolloid.

13. Method according to claim 1, wherein cations capable of gelling the polysaccharide or hydrocolloid are mixed into the polysaccharide or hydrocolloid solution before addition of said solution to the aqueous stream.

14. Method according to claim 1, wherein the gelled agglomerates are separated from the aqueous stream by flotation, and a flotation agent is added to the polysaccharide or hydrocolloid solution, before adding the solution into the aqueous stream.

15. Method according to claim 14, wherein a shear-mixing pump forces the polysaccharide or hydrocolloid solution and flotation agent into the aqueous stream.

16. Method according to claim 1, wherein the gelled agglomerates are separated from the aqueous stream by sedimentation, and weighting materials are added to the aqueous stream prior to and/or together with the solution of polysaccharide or hydrocolloid to facilitate sedimentation.

17. Method according to claim 1, wherein the polysaccharide or hydrocolloid is a water-soluble salt of alginic acid.

18. Method according to claim 17, wherein the water-soluble salt of alginic acid is one of sodium alginate, potassium alginate, ammonium alginate, magnesium alginate or another salt of alginate and a monovalent cation.

19. Method according to claim 1, wherein the alginate has a guluronate monomer content that is higher than 30%.

20. Method according to claim 1, wherein the alginate has a guluronate monomer content that is higher than 50%.

21. Method according to claim 1, wherein the polysaccharide or hydrocolloid is added into the aqueous stream to a concentration in a range of 0.01 to 500 ppm.

22. Method according to claim 1, wherein the polysaccharide or hydrocolloid is added into the aqueous stream to a concentration in a range of 0.1 to 100 ppm.

23. Method according to claim 1, wherein the polysaccharide or hydrocolloid is added into the aqueous stream to a concentration in a range of 1 to 50 ppm.

24. Method according to claim 1, wherein water used for dissolving the polysaccharide or hydrocolloid in the polysaccharide or hydrocolloid solution is selected from: fresh water, water containing salts and re-circulated process water.

25. Method according to claim 24, wherein a sorption agent is added to the aqueous stream prior to, or together with the anionic polysaccharide or hydrocolloid, the sorption agent is a liquid, and a slurry mixture is prepared by mixing a solid polysaccharide or hydrocolloid, water and sorption agent in a shear mixing device operating with a sufficient shear strength to dissolve the solid polysaccharide or hydrocolloid into a substantially homogeneous solution with the sorption agent dispersed or suspended in said solution.

* * * * *